(12) United States Patent
Blau et al.

(10) Patent No.: US 12,212,457 B2
(45) Date of Patent: Jan. 28, 2025

(54) METHODS, FUNCTION MANAGER AND ORCHESTRATION NODE OF MANAGING A PORT TYPE

(71) Applicant: Telefonaktiebolaget LM Ericsson (publ), Stockholm (SE)

(72) Inventors: Staffan Blau, Spånga (SE); Calin Curescu, Hässelby (SE); Magnus Björkqvist, Gothenburg (SE); Arturo Martin de Nicolas, Brussels (BE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 18/484,843

(22) Filed: Oct. 11, 2023

(65) Prior Publication Data

US 2024/0113937 A1 Apr. 4, 2024

Related U.S. Application Data

(63) Continuation of application No. 17/613,363, filed as application No. PCT/SE2020/050546 on May 29, 2020, now abandoned.

(60) Provisional application No. 62/857,062, filed on Jun. 4, 2019.

(51) Int. Cl.
| | |
|---|---|
| *H04L 41/0806* | (2022.01) |
| *H04L 41/044* | (2022.01) |
| *H04L 41/0895* | (2022.01) |
| *H04L 41/122* | (2022.01) |
| *H04L 41/40* | (2022.01) |

(52) U.S. Cl.
CPC ........ *H04L 41/0806* (2013.01); *H04L 41/044* (2013.01); *H04L 41/0895* (2022.05); *H04L 41/122* (2022.05); *H04L 41/40* (2022.05)

(58) Field of Classification Search
CPC .............. H04L 41/0806; H04L 41/044; H04L 41/0895; H04L 41/122; H04L 41/40; H04L 41/342
See application file for complete search history.

(56) References Cited

U.S. PATENT DOCUMENTS

| | | | |
|---|---|---|---|
| 6,167,052 | A | 12/2000 | McNeill et al. |
| 11,343,226 | B2 * | 5/2022 | Goeringer ............... H04L 63/20 |
| 11,494,692 | B1 * | 11/2022 | Watkins ............. H04L 67/1089 |
| 11,855,855 | B2 * | 12/2023 | Chen ..................... H04L 47/781 |
| 2014/0059226 | A1 | 2/2014 | Messerli et al. |

(Continued)

FOREIGN PATENT DOCUMENTS

RU    2584471 C1    5/2016

OTHER PUBLICATIONS

"Network Functions Virtualisation (NFV) Release 2; Management and Orchestration; Or-Vnfm reference point—Interface and Information Model Specification", ETSI GS NFV-IFA 007 V2.5.1, Aug. 2018, 146 pages.

(Continued)

*Primary Examiner* — Michael Won
(74) *Attorney, Agent, or Firm* — Murphy, Bilak & Homiller, PLLC (57) ABSTRACT

Embodiments relate to e.g. a method performed by an orchestration node for managing network interfaces. The orchestration node sends to a function manager, trunk-port specific information of a trunk port to enable the function manager to unambiguously orchestrate trunk ports.

6 Claims, 9 Drawing Sheets

(56) References Cited

U.S. PATENT DOCUMENTS

| | | |
|---|---|---|
| 2014/0280817 A1 | 9/2014 | Uppalapati et al. |
| 2017/0223117 A1 | 8/2017 | Messerli et al. |
| 2017/0279672 A1 | 9/2017 | Krishnan et al. |
| 2018/0013586 A1 | 1/2018 | Wang |
| 2018/0077020 A1 | 3/2018 | Li et al. |
| 2019/0068463 A1 | 2/2019 | Li |
| 2019/0149434 A1 | 5/2019 | Chou et al. |
| 2019/0394658 A1 | 12/2019 | Baillargeon |
| 2020/0084091 A1 | 3/2020 | Iovene et al. |
| 2021/0051077 A1 | 2/2021 | Dempo |
| 2021/0064410 A1 | 3/2021 | Yun et al. |
| 2022/0417112 A1 | 12/2022 | Chen |
| 2023/0073931 A1* | 3/2023 | Watkins ............... G06N 3/006 |
| 2024/0113937 A1* | 4/2024 | Blau ................ H04L 41/0895 |

OTHER PUBLICATIONS

Ericsson LM, et al., "IFA007ed251 Trunk mode modelling in VnfInfo", NFVIFA(18)000358, NFVIFA#97, ETSI, Apr. 19, 2018, 1-4.

Ericsson LM, "SOL003ed311 Support of Trunking", NFVSOL(19)000368, NFVSOL#102-F2F Sophia Antipolis, ETSI, Jun. 7, 2019, 1-5.

ETSI, "ETSI GS NFV-IFA 005 V3.1.4", Network Functions Virtualisation (NFV) Release 3; Management and Orchestration; Or-Vi reference point—Interface and Information Model Specification, Feb. 2019, 1-196.

ETSI, "ETSI GS NFV-IFA 006 V3.1.2", Network Functions Virtualisation (NFV) Release 3; Management and Orchestration; Vi-Vnfm reference point—Interface and Information Model Specification, Nov. 2018, 1-132.

ETSI, "ETSI GS NFV-IFA 007 V3.2.2", Network Functions Virtualisation (NFV) Release 3; Management and Orchestration; Or-Vnfm reference point—Interface and Information Model Specification, May 2019, 1-192.

ETSI, "ETSI GS NFV-SOL 001 V2.5.1", Network Functions Virtualisation (NFV) Release 2; Protocols and Data Models; NFV descriptors based on TOSCA specification, Dec. 2018, 1-205.

ETSI, "ETSI GS NFV-SOL 003 V2.3.1", Network Functions Virtualisation (NFV) Release 2; Protocols and Data Models; RESTful protocols specification for the Or-Vnfm Reference Point, Jul. 2017, 1-273.

Martin De Nicolas, Arturo, "Support of segmented networks (trunking)", NFVIFA(19)00538, ETSI, Jun. 6, 2019, 1-11.

* cited by examiner

| Attribute namee | Data type | Cardinality | Description |
|---|---|---|---|
| macAddress | MacAddress | 0..1 | MAC address. If this attribute is not present, it shall be chosen by the VIM. See note 1. |
| >segmentationId | String | 0..1 | If this Cp instance is part of a trunk port then segmentationId needs to be present. |
| ipAddresses | Structure (inlined) | 0..N | List of IP addresses to assign to the CP instance. Each entry represents IP address data for fixed or dynamic IP address assignment per subnet. |
| | | | If this attribute is not present, no IP address shall be assigned. See note 1. |
| >type | Enum (inlined) | 1 | The type of the IP addresses. |
| | | | Permitted values: IPV4, IPV6. |
| >fixedAddresses | IpAddress | 0..N | Fixed addresses to assign (from the subnet defined by "subnetId" if provided). See note 2. |
| >numDynamicAddresses | Integer | 0..1 | Number of dynamic addresses to assign (from the subnet defined by "subnetId" if provided). See note 2. |
| >addressRange | Structure (inlined) | 0..1 | An IP address range to be used, e.g. in case of egress connections. |
| | | | In case this attribute is present, IP addresses from the range will be used. See note 2. |
| >>minAddress | IpAddress | 1 | Lowest IP address belonging to the range. |
| >>maxAddress | IpAddress | 1 | Highest IP address belonging to the range. |
| >subnetId | IdentifierInVim | 0..1 | Subnet defined by the identifier of the subnet resource in the VIM. |
| | | | In case this attribute is present, IP addresses from that subnet will be assigned; otherwise, IP addresses not bound to a subnet will be assigned. |
| NOTE 1: At least one of "macAddress" or "ipAddresses" shall be present. | | | |
| NOTE 2: Exactly one of "fixedAddresses", "numDynamicAddresses" or "ipAddressRange" shall be present. | | | |

← new attribute (points to segmentationId)

METHODS, FUNCTION MANAGER AND ORCHESTRATION NODE OF MANAGING A PORT TYPE

RELATED APPLICATIONS

This application is a continuation application of U.S. application Ser. No. 17/613,363 filed 22 Nov. 2021, which is a U.S. National Phase of PCT/SE2020/050546 filed 29 May 2020, which claims benefit of Provisional Application No. 62/857,062 filed 4 Jun. 2019. The entire contents of each aforementioned application is incorporated herein by reference.

TECHNICAL FIELD

Embodiments herein relate to an orchestration node, a function manager and methods performed therein for communication networks. In particular, embodiments herein relate to managing a port type in a communication network, and specifically how to, in a European Telecommunications Standards Institute (ETSI) Network Functions Virtualization (NFV)-Management and Orchestration (MANO) architecture and orchestration standards, model and manage trunk type communication ports of a Virtualized Network Function (VNF) application.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

NFV-MANO based orchestration and management may be implemented for managing the network functions in any communication network such as a Radio Access Network (RAN), or for network functions in the mobile core network (CN), in service networks such as IP multimedia subsystem (IMS), in the user data management network, etc. In a typical communication network, User Equipments (UE), also known as wireless communication devices, mobile stations, stations (STA) and/or wireless devices, communicate via a RAN to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a NodeB, an eNodeB, or a gNodeB.

In the European Telecommunications Standards Institute (ETSI) Network Functions Virtualization (NFV)-Management and Orchestration (MANO) architecture (see FIG. 1) for orchestration and life-cycle management of virtualized networks and Virtualized Network Function (VNF) applications, the NFV Orchestrator (NFVO) interacts with the Virtualization Infrastructure Manager (VIM) of a cloud to set up and manage networking resources, while it delegates to a VNF Manager (VNFM) to interact with the VIM in order to orchestrate and manage the compute and storage resources, and networking interfaces needed in the cloud for a VNF instance.

Figure 1:
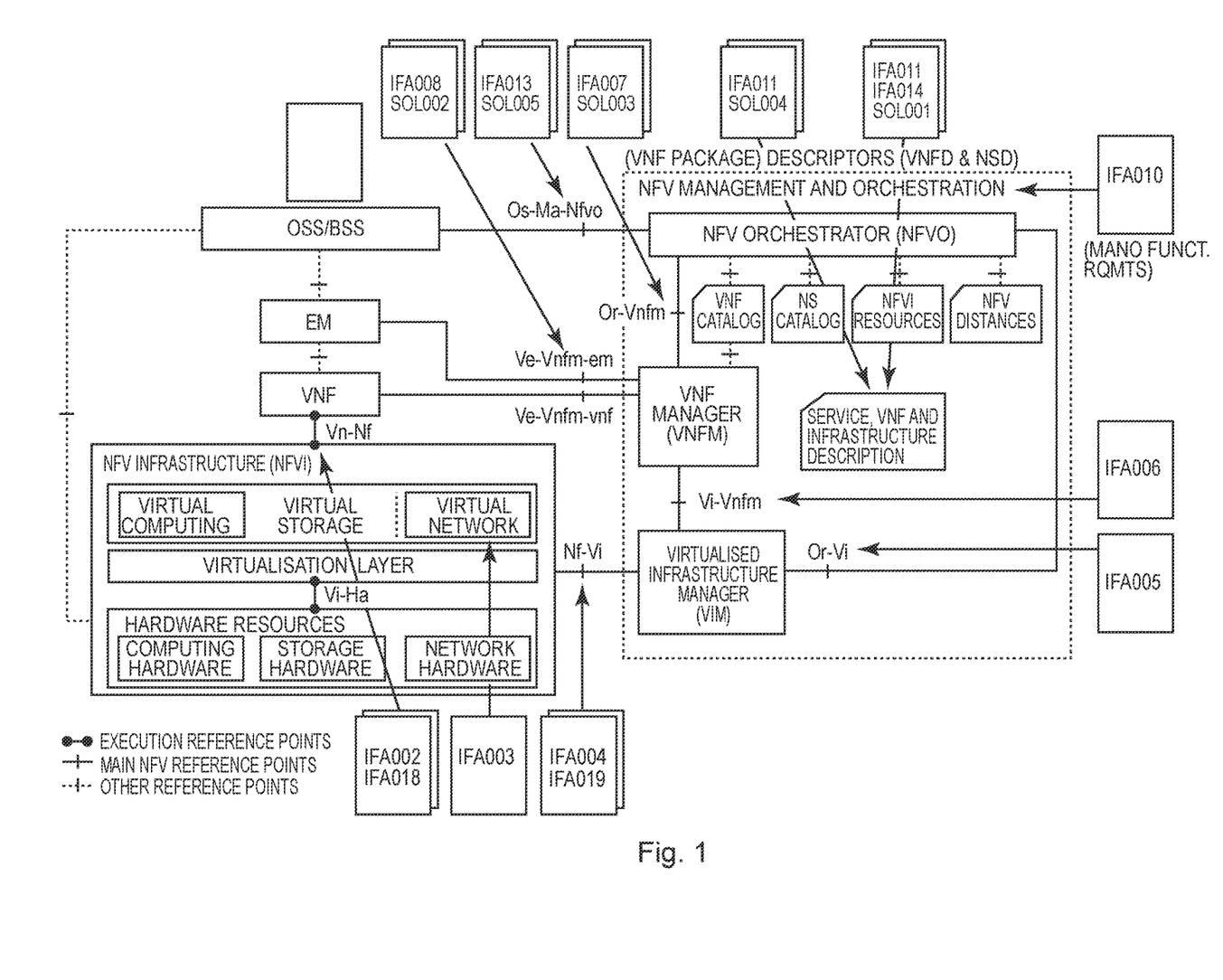
FIG. 1 shows NFV-MANO architectural components according to prior art.

FIG. 1 shows the NFV-MANO architectural components and the ETSI specifications that relates to the different components and interfaces.

The VNFM bases the interactions with the VIM of a cloud infrastructure on a combination of:
  a) information in the VNF Descriptor (VNFD), which is a Topology and Orchestration Specification for Cloud Applications (TOSCA) Service Template that is delivered together with the software for the VNF. The VNFD is specified in accordance with the ETSI GS NFV-SOL001 specification, which describes how to in a declarative syntax, model the VNF's network interfaces, its storage needs, its compute resource needs, its supported instantiation levels, supported deployment variations, and lifecycle management operations.
  b) information received from the NFVO over the Or-Vnfm reference point. The VNFD is deployment agnostic—details like IP addresses, what deployment level to use, how many deployment units, e.g., Virtual Machines (VM) or Containers, to instantiate, etc., is information that the NFVO will provide to the VNFM for each particular VNF instance it wants to be created by the VNFM. The information elements used in the communication over the Or-Vnfm reference point are specified in ETSI GS NFV-SOL003.

With regards to computer networking, an application comprises one or more deployment units, such as VMs. Containers, Central Processing Unit (CPU) boards, etc., that in the VNFD is modelled by a concept called Virtualization Deployment Unit (VDU). These deployments have network interfaces to connect to the underlying network transport technology, e.g., Virtual Local Access Network (VLAN). Virtual Extensible LAN (VXLAN), Generic Routing Encapsulation (GRE), etc., through which they can communicate with other application units and/or with a router that connects the application to the outside world. These network interfaces are modelled in the VNFD with a concept called Connection Point Descriptors (CPD). A CPD normally models an ethernet interface, on a VDU, that connects the VDU to a single network. Such network interfaces are often referred to as access ports. Alternatively, the CPD may represent a network interface via which the VDU connects to multiple networks. Such network interfaces are commonly referred to as trunk ports.

SUMMARY

An access port, which may be considered a "normal" port, only connects the deployment unit to a single network. A trunk port, however, may be viewed upon as a segmented network interface on a deployment unit, through which the deployment unit may connect to multiple networks. In other words, the trunk port comprises a plurality of sub-interfaces. A problem with the current specification SOL001 for the VNFD, and specification SOL003 for the Or-Vnfm interface, is that the specifications do not adequately specify what is needed for creating and managing trunk ports. As mentioned above, the VNFD models network interfaces on VDUs using a construct called CPD. The CPD has an attribute "trunk_mode" which if specified with a value "true", wherein the value "true" indicates to the NFVO that this CPD represents a trunk port and that it shall, for connection point (CP) instances modelled by this CPD, send to the VNFM information that enables the VNFM to create and manage a trunk port and its network sub-interfaces.

Thus, a problem is that the specification SOL003 does not specify how to actually send information for CP instances modelled by a CPD that represents a trunk port, and further does not specify how to support the use-case of dynamically adding or removing a network or a network sub-interface, for an existing trunk port. This is completely up to interpretation of each NFVO and VNFM implementation since no specification and common understanding exists on how to deal with the sub-interface multiplicity and dynamics that comes inherently with trunk ports.

A simple and direct way may be to model, in the VNFD, each sub-interface of a trunk port as its own CPD. However, a drawback is for example that using a trunk port for connecting the VNF to tenant specific. e.g., enterprise, networks, where it needs to support access to very many, such as a hundred or more, enterprise/tenant networks, results in that the VNFD needs to model a very large number of CPDs for a VDU. Also, modelling each network termination within a trunk-port as its own CPD may provide a very poor support for the use case of on-demand adding or removing network sub-interfaces to a trunk port of an already existing VNF instance. Basically, this would mean that one would need to update the VNFD, thus provide a new version of the TOSCA service template, and then make a VNF update for each change. This may well also require an update to the network service descriptor the NFVO works with.

Adding or removing a tenant network happens during runtime, and it is not possible to non-disruptively change the VNFD of a running service, obviously, this is totally prohibitive for the modeling even of a small number of tenants. It is therefore a need to provide solutions addressing one or more of the above problems to enable an efficient handling of data communication in a communication network.

According to one aspect, the object is achieved by providing a method performed by an orchestration node, such as a NFVO, for managing network interfaces, e.g. trunk network interfaces. The orchestration node sends to a function manager e.g. a network-function manager such as a VNFM, trunk-port specific information of a trunk port to enable the function manager to unambiguously orchestrate trunk ports. Thus, there is herein provided a method for managing ports. e.g. orchestrating trunk ports. The method may update SOL003, detailing a solution for how the NFVO can provide trunk-port specific information to a VNFM in such a way that the VNFM can unambiguously orchestrate trunk ports, including allowing for on-demand adding or removing trunk port connectivity to different networks without having to update the VNFD. The method may additionally or alternatively use the present VNFD model specified in SOL001, with a single CPD for each port, disregarding whether it is a trunk port or a normal port, just indicating whether a CPD models a trunk port or a normal port (via the trunk_mode attribute). The trunk_mode attribute is information about whether the CP instantiated from this CPD is in Trunk mode. When operating in "trunk mode", the CP is capable of carrying traffic for several VLANs.

According to another aspect, the object is achieved by providing a method performed by a function manager for managing network interfaces. The function manager receives from an orchestration node, trunk-port specific information of a trunk port; and orchestrates the trunk port based on the received trunk-port specific information.

According to another aspect, the object is achieved by providing an orchestration node, such as a NFVO, for managing network interfaces. The orchestration node is adapted to send to a function manager such as a VNFM, trunk-port specific information of a trunk port to enable the function manager to unambiguously orchestrate trunk ports.

According to yet another aspect, the object is achieved by providing a function manager for managing network interfaces. The function manager is adapted to receive from an orchestration node, trunk-port specific information of a trunk port; and orchestrate the trunk port based on the received trunk-port specific information.

Embodiments herein achieve an efficient handling of data communication in a communication network, for both mobile and fixed networks, since the trunk-port specific information enables the function manager to unambiguously orchestrate trunk ports. E.g. it allows during orchestration to dynamically add and remove networks such as VLANs.

BRIEF DESCRIPTION OF THE DRAWINGS

Embodiments will now be described in more detail in relation to the enclosed drawings, in which:

FIG. 3 is a block diagram depicting a new attribute in the IpOverEthernetAddressData in Or-Vnfm according to some embodiments;

DETAILED DESCRIPTION

Figure 2A:
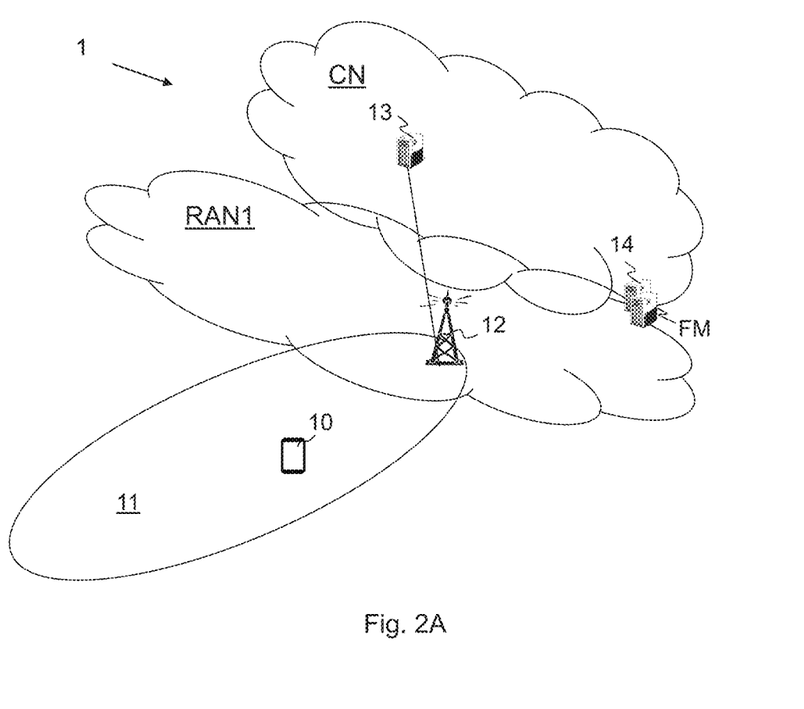
FIG. 2A is a schematic overview depicting a communication network implementing embodiments herein.

Embodiments herein relate to VNFs and the implementation of an NFV-MANO architecture for virtualization of using network resources of the RAN, IP multimedia subsystem (IMS) and/or the CN, e.g. resources of a radio network node and/or a network node. Thus, the proposed solution may be implemented in any communication network and embodiments hence relates relate to communication networks in general. FIG. 2A is a schematic overview depicting an exemplary communication network 1 just to illustrate an implementation. The communication network 1 may comprise e.g. one or more access networks, such as radio access networks (RAN) e.g. a first RAN (RAN1), connected to one or more core networks (CN). The communication network 1 may use a number of different technologies, such as Wi-Fi. Long Term Evolution (LTE), LTE-Advanced, 5G, Wideband Code Division Multiple Access (WCDMA), Global System for Mobile communications/

Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the exemplary communication network 1, user equipments (UE) e.g. a UE 10 such as a mobile station, a non-access point (non-AP) station (STA), a STA, a wireless device and/or a wireless terminal, are connected via the one or more RANs, to the one or more CNs. It should be understood by those skilled in the art that "UE" is a non-limiting term which means any terminal, wireless communication terminal, user equipment, Machine Type Communication (MTC) device. Internet of Things (IoT) operable device, Device to Device (D2D) terminal, mobile device e.g. smart phone, laptop, mobile phone, sensor, relay, mobile tablets, or any device communicating within a cell or service area.

The communication network 1 comprises a radio network node 12 providing radio coverage over a geographical area, a service area 11 or a cell, of a first radio access technology (RAT), such as New Radio (NR), LTE. UMTS, Wi-Fi or similar. The radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a gNodeB, a base transceiver station. Access Point Base Station, base station router, a transmission arrangement of a radio base station, a stand-alone access point or any other network unit capable of serving a UE within the service area served by the radio network node 12 depending e.g. on the first radio access technology and terminology used.

The communication network 1 further comprises a network node 13 such as a RAN node and/or a core network node e.g. Radio Software Defined Networking (SDN) node, an Access and Mobility Management Function (AMF) node, a mobility management entity (MME), a serving gateway (S-GW), a Serving GPRS Support Nodes (SGSN) node, or corresponding node in e.g. a 5G network or similar. The GPRS meaning General Packet Radio Services.

Embodiments herein extends capabilities of the NFV-MANO standard framework to, from an orchestration and management point of view, model trunk port attachments to multiple networks for e.g. "virtual machines" and "operating system containers" that are the software deployment units of a Virtual Network Function (VNF) product.

The NFV-MANO instructs what and where the resources, such as processing capacity and memory storage of network nodes in e.g. the communication network 1, are localized and used for a virtual network. The NFV-MANO architecture comprises an orchestration node 14 that may comprise a NFVO that delegates the orchestration of the individual VNFs to a function manager such as a VNFM. The orchestration node 14 may further comprise the function manager. The NFVO provides deployment specific parameters such as e.g. IP addresses, what deployment level to use, how many deployment units e.g. VMs or Containers to instantiate, etc. to the function manager for a VNF instance to be created by the function manager. It should be noted that the orchestration node 14 may be a standalone node or a distributed network node comprising functions distributed over several network nodes such as the network node 13.

According to embodiments herein the NFVO of the orchestration node 14 may configure setup of a VNF in the communication network 1 by instructing the function manager e.g. VNFM which may be a standalone node or co-located with the orchestration node 14. In the communication to VNFM the NFVO shall, according to current SOL003, on a per network send a list of connection point information elements, where each connection point information element refers to a real-time instance of a connection point/port that connects to the network. Embodiments herein extend this so that for a CPD that represents a trunk port, the NFVO may instead include a connection point information element for each network sub-interface of the trunk port CPD. Each of these connection point information elements refer in their "cpdId" attribute to the same CPD in the VNFD, so that the VNFM can understand that although the connection point information elements are for connecting to different networks, they actually belong to same trunk port definition. Thus, the NFVO may, for each sub-interface of a trunk port CPD, include a network id/name that identifies an external network in the context of the VNF.

Also, additionally according to some embodiments, a "segmentationId" property may further be added to the connection point data information, which provides the following: When an application in real time is sending or receiving a packet over a trunk port, a segmentation id in the packet header identifies what network the packet relates to. A cloud that supports trunk ports may use this in one of two ways.

In clouds like Openstack the segmentation id is an identifier used between the application and the cloud networking infrastructure to identify the network sub-interface of the trunk port in question. The cloud infrastructure will remap this local segmentation id to whatever segmentation id is actually used by the clouds transport technology—which could be a VLAN id, a VXLAN segmentation id, a GRE tunnel id, etc. In this case, when attaching a network to a trunk port one need to tell the VNFM, so it can inform the VIM, on what local segmentation id the application will use for each particular network, and the segmentationId in the connection point information element serves this purpose. Moreover, dynamically adding or removing networks connected to a trunk port, needs the identification in the Or-Vnfm communication exactly which network's sub-interface shall be added/removed in the trunk-port. The segmentationId serves also for this.

In clouds like VMware, the segmentation id used by the application must actually be the network identifier, e.g. VLAN id. VXLAN segmentation id, etc., used in the transport header of the packets transported by the networking infrastructure, and there is then no remapping done to any infrastructure and transport technology specific segmentation id. In this case it is actually not really needed to include a segmentation id in the connection point information element, since the cloud infrastructure may anyway only check that it receives in the packet header a segmentation id it knows is associated with a network to which the trunk port connects. However, it is recommended to anyway always include segmentation id in this case since it makes it more obvious that the information element is referring to a network sub-interface, with the respective segmentation id, of a trunk port.

Some usages may require a segmentation id that is unique for a VNF, that is if two different trunk ports in the VNF have a network sub-interface that connects to the same network, then the segmentation id should be the same.

Also note that while trunk ports are understood in the context of VLANs, a similar embodiment may be used with respect to other network segmentation methods.

Exemplary advantages of some embodiments include the following: It allows during orchestration to dynamically add and remove networks such as VLANs, for example when VLANs are employed for tenant isolation, without changing the CPD of the VNFD, that is, without changing the VNF model.

It supports both situations where the trunk-port specific information such as the segmentation id, i.e. tag:
- is actually the network identifier. e.g. VLAN id, VXLAN segmentation id, etc., used in the transport header of the packets transported by the networking infrastructure.
- is just an identifier used between the application and the cloud networking infrastructure to identify the network in question—normally then exchanged in the packet header conveyed between the application and the networking infrastructure.

The proposed solution completes and is formulated to create minimal disruption to the existing ETSI MANO framework.

One or more of these advantages may be provided in a system of a NFVO. VNFM and VIM nodes (with the emphasis on the NFVO and VNFM communication) in accordance with further aspects of the proposed solution.

According to some embodiments, one or more of the following may be included:
- A CPD, in the VNFD, that has the trunk_mode set to true is used to represent the connectivity to all the networks in a trunk port.
- A single virtual link requirement, in VNFD, may be used as a requirement on a virtual link that supports either:
  - one untagged (non-segmented) network—in case the CPD for which the requirement is valid has "trunk_mode=false"
  - a set of tagged networks, for example a set of VLANs, if the CPD has "trunk_mode=true"
- During lifecycle management time, NFVO provides an element ExtVirtualLinkData for each of the networks interfaced by the VNF instance to the VNFM. Inside this element there is a set of elements of type VnfExtCpData, one for each connection point (CP) instance, i.e. representing a network interface, connected to this network, and this is disregarding if the network interface is a sub-interface of a trunk port or a normal port interface. There may be one extCP (type VnfExtCpData) for each CPD instance, but then inside the VnfExtCpData, there may be one cpConfig (type VnfExtCpConfig) for each CP instance. The vnfExtCpData already includes a reference—the cpdId—that refers to the CPD that in the VNFD models the trunk port, allowing the VNFM to correctly identify to which trunk port the CP instance belongs to. All vnfExtCpData that relates to same CPD in the VNFD should indicate same cpdId.
- Each configuration. VnfExtCpConfig, of an element of type VnfExtCpData associated with a network sub-interface in a trunk port may also include a segmentationId in the configuration of its IpOverEthernetAddressData that is sent over the Or-Vnfm, if the cloud supports remapping of segmentation ids, such as is for example the case for a vanilla Openstack.

In accordance with further aspects, the disclosure also proposes an enhancement of lifecycle management (LCM) operation methods between NFVO and VNFM, including one or more of the following.

The LCM operations are enhanced to use the syntax and semantics of the system above when:
- Instantiating the VNF, i.e. the InstantiateVnfRequest operation;
- Changing the external connectivity of the VNF, i.e. the ChangeExtVnfConnectivityRequest operation.

The NFVO issues a ChangeExtVnfConnectivityRequest lifecycle management operation whenever a new network/network-segment is added or removed to/from a trunk port, for example when used for adding networks such as tenant specific VLANs.

Figure 2B:
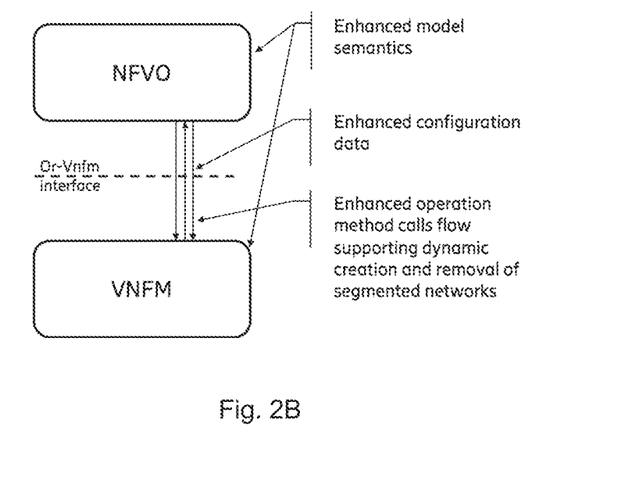
FIG. 2B is a system detail including an NFVO and a VNFM.

FIG. 2B shows a system detail including the NFVO and VNFM, which communicate using the Or-Vnfm Interface. The NFVO i.e. the orchestration node 14 may comprise an enhanced model semantics. The Or-Vnfm Interface passes enhanced configuration data and the VNFM shows an enhanced operation method that supports dynamic creation and removal of segmented networks.

FIG. 3 shows a new attribute in the IpOverEthernetAddressData in Or-Vnfm according to some embodiments, wherein the new attribute is defined as a segmentationId. The segmentationId is a string data type with a cardinality of 0-1. The segmentationId may be present when Cp instance is part of a trunk port.

Figure 4:
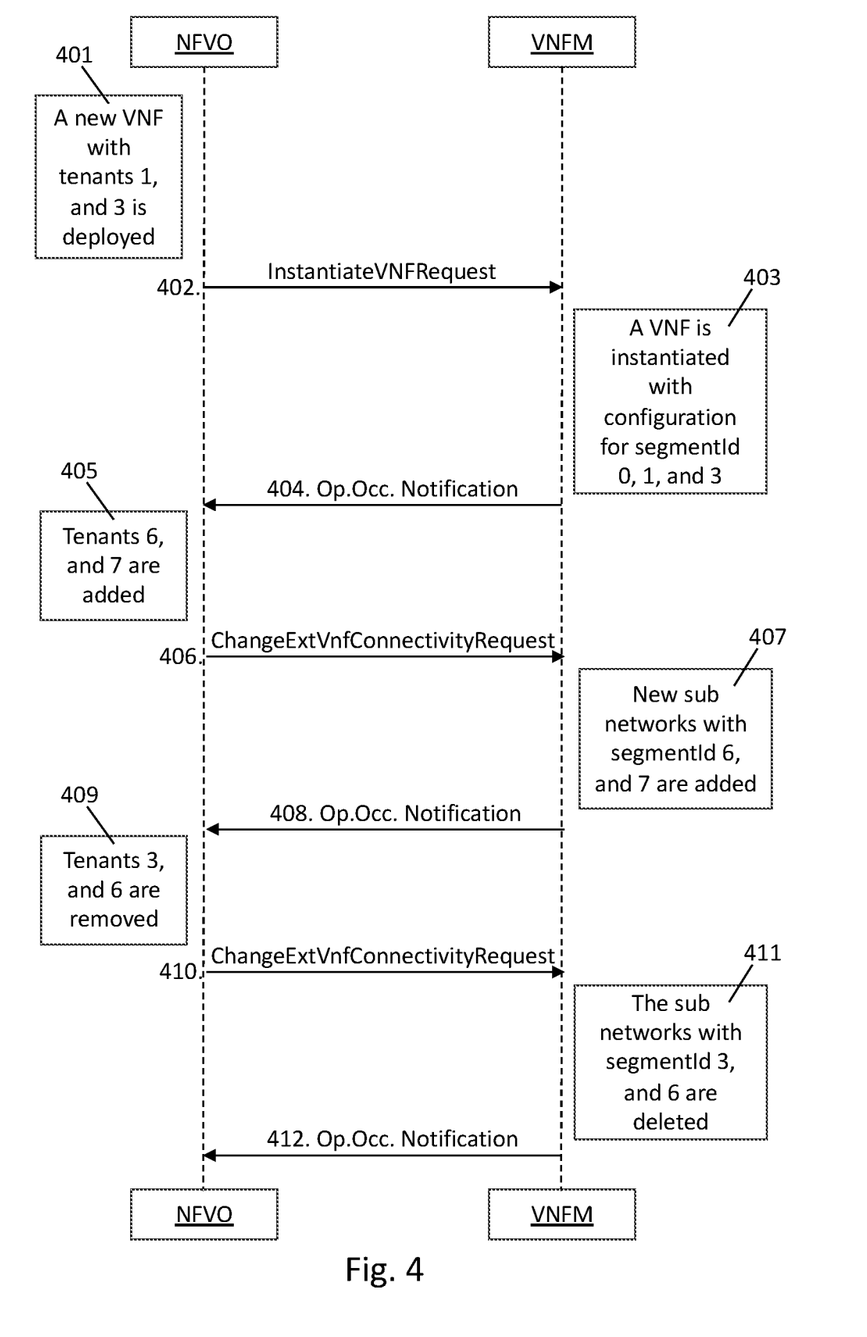
FIG. 4 is a flow sequence according to embodiments herein.

FIG. 4 shows a Sequence diagram for the adding/removing of tenants and VLANs according to some embodiments presented herein. Action 401. A new VNF with tenants 1, and 3 is deployed. Action 402. The NFVO transmits an instantiateVNFrequest to the VNFM. Action 403. At the VNFM a VNF is instantiated with configuration for segmentationId 0, 1 and 3. Action 404. The VNFM transmits an Op.Occ.Notification to the NFVO. Action 405. Tenants 6 and 7 are added. Action 406. The NFVO transmits a changeExtVnfConnectivityRequest to the VNFM. Action 407. New sub networks with segmentationId 6 and 7 are added. Action 408. The VNFM transmits an Op.Occ.Notification to the NFVO. Action 409. Tenants 3 and 6 are removed. Action 410. The NFVO transmits a changeExtVnfConnectivityRequest to the VNFM. Action 411. The sub networks with segmentationId 3 and 6 are removed. Action 412. The VNFM transmits an Op.Occ.Notification to the NFVO.

Figure 5A:
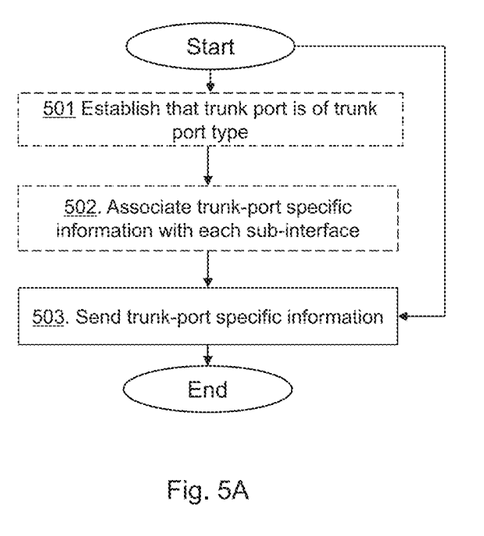
FIG. 5A is a schematic flowchart depicting a method performed by an orchestration node according to embodiments herein.

The method actions performed by an orchestration node 14 for managing network interfaces according to embodiments will now be described with reference to a flowchart depicted in FIG. 5A. The actions do not have to be taken in the order stated below, but may be taken in any suitable order. Actions performed in some embodiments are marked with dashed boxes.

Action 501. The orchestration node 14 may establish that the trunk port is a trunk port type comprising a plurality of network sub-interfaces.

Action 502. The orchestration node 14 may associate with each network sub-interface of said trunk port a respective trunk-port specific information. The orchestration node 14 may e.g. associate with each network sub-interface of said trunk port the respective trunk-port specific information by adding a segmentation identity to a configuration. Trunk-port specific may comprise a network identifier and conditionally a segmentation id, e.g. for the openstack VIM the segmentation id is optional—if not provided then the VIM will assign a segmentation id, for VMware VIM the segmentation id is identical to the vlan id and need not be provided by the NFVO.

Action 503. The orchestration node 14 sends to the function manager, trunk-port specific information of the trunk port to enable the function manager to unambiguously orchestrate trunk ports. E.g. a network id/tag/name of the network of the subport may be present. The orchestration node 14 may be a Network Functions Virtualization Orchestrator and/or the function manager may be a Virtualized Network Function Manager. If the Cp instance represents a subport in a trunk, segmentationId may be present. The trunk-port specific information may comprise an identifier used between an application and networking infrastructure to identify a network sub-interface of the trunk port in question. Depending on the NFVI networking infrastructure, the segmentationId may indicate the actual network segment value, e.g. vlan Id, Vxlan segmentation id, etc., used in the transport header of the packets or it may be an identifier used between the application and the NFVI networking infrastructure to identify the network sub-interface of the trunk port in question. In the latter case the NFVI infrastructure will map this local segmentationId to whatever segmentationId is actually used by the NFVI's transport technology. The trunk-port specific information may comprise an identifier such as a Segmentation ID for each network sub-interface of said trunk port. Said trunk-port specific information may comprise a sub-interface network identifier or a sub-interface network tag, identifying which network the network sub-interface connects to.

Figure 5B:
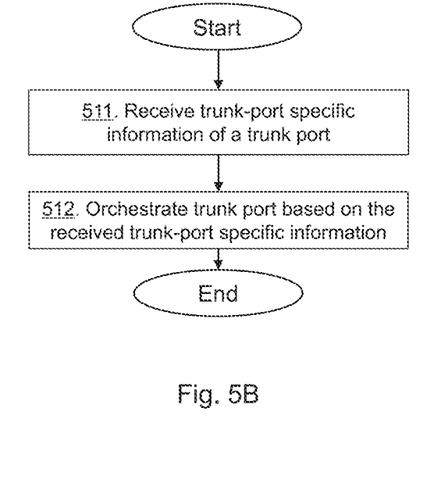
FIG. 5B is a schematic flowchart depicting a method performed by a function manager according to embodiments herein.

The method actions performed by the function manager for managing network interfaces according to embodiments will now be described with reference to a flowchart depicted in FIG. 5B.

Action 511. The function manager receives from the orchestration node 14, trunk-port specific information of the trunk port e.g. Cp instance represents a subport in a trunk, segmentationId shall be present. The trunk-port specific information comprises the identifier used between the application and networking infrastructure to identify the network sub-interface of the trunk port in question. The trunk-port specific information comprises an identifier for each sub-interface of said trunk port, and e.g. a segmentationID sent in action 503, said trunk-port specific information comprises a sub-interface network identifier or a sub-interface network tag, identifying which network the network sub-interface connects to.

Action 512. The function manager orchestrates the trunk port based on the received trunk-port specific information. The orchestration node 14 may be a Network Functions Virtualization Orchestrator and/or the function manager may be a Virtualized Network Function Manager. The orchestrator node 14 and the function manger may be comprised in same or different network nodes. The function manager may orchestrate the trunk port by adding and/or removing network sub-interfaces to/from a trunk port based on the received trunk-port specific information.

Figure 5C:
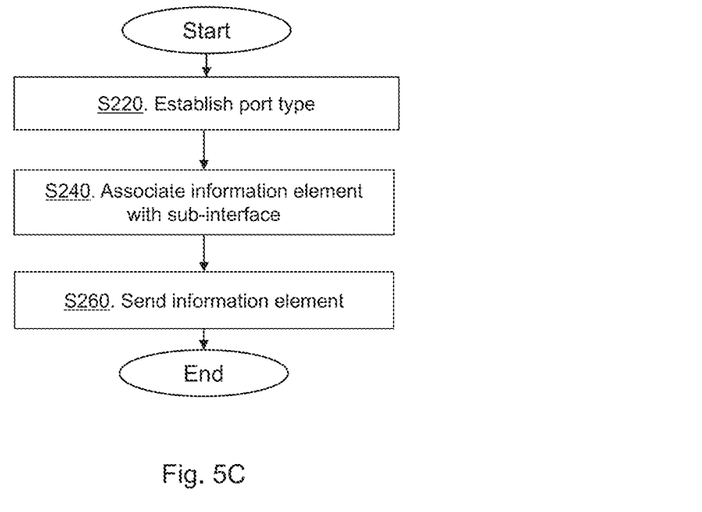
FIG. 5C is a schematic flowchart depicting a method performed by an orchestration node according to embodiments herein.

FIG. 5C shows an exemplary flow chart of a method performed by the orchestration node 14 for managing the port type comprising a plurality of network sub-interfaces according to some embodiments, where in the method comprises:

establishing, S220, that the port is of said port type, based on a first information element;

associating, S240, with each sub-interface of said port an information element of said first information element; and sending, S260, to the function manager said information element for each sub-interface.

Figure 6:
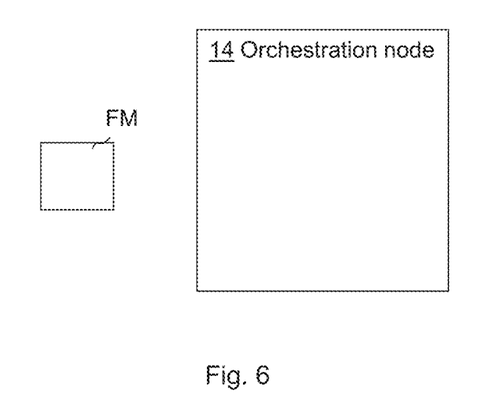
FIG. 6 is a block diagram depicting an orchestration node and a function manager according to embodiments herein.

FIG. 6 shows a block diagram depicting the orchestration node 14 and the function manager (FM) for managing network interfaces. The orchestration node 14 is adapted to send to the function manager, trunk-port specific information of the trunk port in such a way that the function manager can unambiguously orchestrate trunk ports. The trunk-port specific information may comprise the identifier used between an application and networking infrastructure to identify the network sub-interface of the trunk port in question. The orchestration node 14 may further be adapted to establish that the trunk port is a trunk port type comprising a plurality of network sub-interfaces; and to associate with each network sub-interface of said trunk port a respective trunk-port specific information. The trunk-port specific information may comprise the identifier for each network sub-interface of said trunk port. The orchestration node may be a Network Functions Virtualization Orchestrator and/or the function manager may be a Virtualized Network Function Manager. The orchestration node may be adapted to associate with each network sub-interface of said trunk port the respective trunk-port specific information by adding a segmentation identity to a configuration. Said trunk-port specific information may comprise the sub-interface network identifier or the sub-interface network tag, identifying which network the network sub-interface connects to.

The function manager is adapted to receive from the orchestration node 14, trunk-port specific information of the trunk port; and to orchestrate the trunk port based on the received trunk-port specific information. The trunk-port specific information may comprise the identifier used between an application and networking infrastructure to identify the network sub-interface of the trunk port in question. The trunk-port specific information may comprise the identifier for each network sub-interface of said trunk port. Said trunk-port specific information may comprise the sub-interface network identifier or the sub-interface network tag, identifying which network the network sub-interface connects to. The function manager may be adapted to orchestrate the trunk port by adding and/or removing network sub-interfaces to/from a trunk port based on the received trunk-port specific information.

While processes in the figures may show a particular order of operations performed by certain embodiments of the present disclosure, it should be understood that such order is exemplary, e.g., alternative embodiments may perform the operations in a different order, combine certain operations, overlap certain operations, etc.

The disclosure further discloses some embodiments:

1. A method performed by an orchestration node for managing a port type comprising a plurality of network sub-interfaces, the method comprising:

establishing that a port is of said port type, based on a first information element;

associating with each sub-interface of said port an information element of said first information element; and sending to a function manager said information element for each sub-interface.

2. The method of embodiments 1, further comprising associating an identifier with each sub-interface of said port.

3. The method of any one of embodiments 1 and 2, wherein the orchestration node is a Network Functions Virtualization Orchestrator.

4. The method of any one of embodiments 1 to 3, wherein the function manager is a Virtualized Network Function Manager.

5. The method of any one of embodiments 2 to 4, wherein associating an identifier with each sub-interface of said port comprises adding a segmentation id to a data structure.
6. The method of any one of embodiments 2 to 5, wherein said identifier comprises a sub-interface network identifier or a sub-interface network tag, identifying which network the sub-interface connects to.
7. A node method for managing a port type comprising a plurality of network sub-interfaces, the node adapted to:
   establish that a port is of said port type, based on a first information element;
   associate with each sub-interface of said port an information element of said first information element; and
   send to a function manager said information element for each sub-interface.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

ABBREVIATIONS

Abbr. Explanation
CP Connection Point
CPD CP Descriptor
ETSI European Telecommunications Standards Institute
LCM Life Cycle Management
NFV Network Function Virtualization
NFVI NFV Infrastructure resources (compute, storage, networking)
NFV-MANO ETSI NFV Lifecycle Management and Orchestration architecture
NFVO NFV Orchestrator
TOSCA Topology and Orchestration Specification for Cloud Applications
VDU Virtualization Deployment Unit
VIM Virtualization Infrastructure Manager
VM Virtual Machine
VNF Virtualized Network Function
VNFD VNF Descriptor
VNFM VNF Manager

What is claimed is:

1. A method of configuring external network connectivity in a cloud operating system for supporting a cloud application, the method performed by a Virtualized Network Functions Manager (VNFM) and comprising:
   receiving information from a Network Functions Virtualization Orchestrator (NFVO), the information comprising a Virtual Network Function Descriptor (VNFD) for a Virtual Network Function (VNF) representing the cloud application and associated configuration information, the VNFD indicating one or more Connection Points (CPs) for connecting the VNF to one or more external networks and, for each CP, indicating whether the connection point is to be realized as a trunk port or a normal port, the configuration information comprising information elements, where each information element specifies how cloud infrastructure connects to a specific external network;
   identifying respective ones among the information elements that are associated with a CP that is to be realized as a trunk port, based on recognizing information elements that are referenced to a same CP Identifier (CP-ID); and
   sending signaling towards a Virtualized Infrastructure Manager (VIM), the signaling instructing the VIM to configure the one or more CPs indicated in the VNFD, including instructing the VIM to configure the one or more CPs to be realized as a trunk port, where each trunk port has a respective sub-interface for each of the different external networks to be accessed through the associated CP.

2. The method according to claim 1, wherein receiving the configuration information comprises receiving the configuration information over an Or-Vnfm interface point coupling the NFVO to the VNFM, the Or-Vnfm interface defined by the European Telecommunications Standards Institute (ETSI) Group Specification (GS) NFV-SOL 003.

3. The method according to claim 2, wherein the information elements are two or more vnfExtCpData structures, as defined in ETSI GS NFV-SOL 003.

4. The method according to claim 3, wherein each vnfExtCpData structure identifies a respective external network via a segmentationId, and wherein the signaling sent towards the VIM includes the segmentationIds included in the two or more vnfExtCPData structures.

5. The method according to claim 1, wherein each information element includes a segmentation-Id that identifies a specific external network.

6. The method according to claim 1, further comprising, subsequent to sending the signaling towards the VIM, receiving updated configuration information for the VNF, the updated configuration information identifying modifications to the trunk port, and wherein the method further comprises sending further signaling towards the VIM, indicating the modifications.

* * * * *

UNITED STATES PATENT AND TRADEMARK OFFICE
CERTIFICATE OF CORRECTION

| | | |
|---|---|---|
| PATENT NO. | : 12,212,457 B2 | Page 1 of 1 |
| APPLICATION NO. | : 18/484843 | |
| DATED | : January 28, 2025 | |
| INVENTOR(S) | : Blau et al. | |

It is certified that error appears in the above-identified patent and that said Letters Patent is hereby corrected as shown below:

On the Title Page

Item (72), under "Inventors", in Column 1, Line 2, delete "Håsselby" and insert -- Hässelby --, therefor.

In the Specification

In Column 1, Line 8, delete "2021," and insert -- 2021, now abandoned, --, therefor.

Signed and Sealed this
Sixteenth Day of September, 2025

Coke Morgan Stewart
*Acting Director of the United States Patent and Trademark Office*